United States Patent [19]

Pinnow

[11] 4,367,918
[45] Jan. 11, 1983

[54] PLASTIC CLAD OPTICAL FIBERS

[75] Inventor: Douglas A. Pinnow, Cheshire, Conn.

[73] Assignee: Times Fiber Communications, Inc., Wallingford, Conn.

[21] Appl. No.: 114,196

[22] Filed: Jan. 22, 1980

[51] Int. Cl.³ .............................................. G02B 5/172
[52] U.S. Cl. .................................. 350/96.30; 65/3.12; 350/96.34; 427/163
[58] Field of Search ............... 350/96.30, 96.31, 96.33, 350/96.34; 65/3.1, 3.11, 3.12; 427/163; 428/361, 391

[56] References Cited

U.S. PATENT DOCUMENTS

| | | | |
|---|---|---|---|
| 3,434,776 | 3/1969 | Kern | 331/94.5 |
| 3,480,458 | 11/1969 | Dislich et al. | 427/160 |
| 3,623,903 | 11/1971 | Dislich et al. | 428/392 |
| 3,869,194 | 3/1975 | Shiraishi et al. | 350/96.34 |
| 3,980,390 | 9/1976 | Yamamoto et al. | 350/96.34 X |
| 4,147,407 | 4/1979 | Eichenbaum et al. | 350/96.34 |
| 4,188,089 | 2/1980 | Gliemeroth et al. | 350/96.34 |
| 4,243,299 | 1/1981 | Gliemeroth et al. | 350/96.34 |

FOREIGN PATENT DOCUMENTS

1441163  6/1976  United Kingdom ............ 350/96.30

OTHER PUBLICATIONS

Kaiser et al., "Low-Loss FEP-Clad Silica Fibers", Applied Optics, vol. 14, No. 1, Jan. 1975, pp. 156-162.
Shah, "Effects of Environmental Nuclear Radiation on Optical Fibers", Bell Syst. Tech. Journal, vol. 54, No. 7, Sep. 1975, pp. 1207-1213.
"Fiber Communications Found Vulnerable to Degradation from Ionizing Radiation", Laser Focus, Oct. 1975, p. 40.
Black, "Fabrication of Optical Fiber Waveguides", Electrical Commun., vol. 51, No. 1, Nov. 1976, pp. 4-11.
Naruse et al., "Nylon-Jacketed Optical Fibre with Silicone Buffer Layer", Electr. Lett., Mar. 1977.
Friebele et al., "Effect of Ionizing Radiation on the Optical Attenuation in . . . ", Appl. Phys. Lett., vol. 32, No. 2, Jan. 1978, pp. 95-97.
Friebele et al., "Effect of Ionizing Radiation on the Optical Attenuation in . . . ", Appl. Phys. Lett., vol. 32, No. 10, May 1978, pp. 619-621.
Yeung et al., "Effect of Temperature on Optical Fiber Transmission", Applied Optics, vol. 17, No. 23, Dec. 1978, pp. 3703-3705.

Primary Examiner—John D. Lee
Attorney, Agent, or Firm—Bacon & Thomas

[57] ABSTRACT

Plastic clad optical fibers and their method of production are disclosed. The fibers are formed of a core of doped silica and a silicone resin cladding.

17 Claims, No Drawings

PLASTIC CLAD OPTICAL FIBERS

BACKGROUND OF THE INVENTION

1. Field of the Invention

This invention is directed to plastic clad optical fibers and their method of production.

2. Description of the Prior Art

Efficient transmission of information through long optical waveguides is dependent on the exceptional optical clarity of existing optical fibers. Technological advances during the 1970's have reduced attenuation in optical fibers to approximately 3 dB/km at 0.8 μm wavelength. However, studies have shown that when these fibers are exposed to ionizing radiation, attenuation increases substantially. The loss is time dependent to the extent that a krad of radiation (3 nsec) increases the loss from 3 dB/km to several thousand dB/km for short time periods on the order of 1 msec or less. The loss rapidly decreases with increasing time after exposure to a residual loss of 30 to 200 dB/km, which may be permanent.

Although there is a relatively wide variation in radiation sensitivity of currently marketed optical fibers, the previously described attenuation behavior is typical of state-of-the-art fibers. This behavior poses a significant problem in designing optical fibers suitable for use in environments where there is a potential for exposure to radiation, particularly nuclear threat environments.

Recent work by Friebele et al, reported in Appl. Phys. Lett., 32, 95 (1978), demonstrates that high dose levels of radiation, in the range of $10^6$ rads, on silicone resin causes only a doubling of the initial loss, i.e., a 3 dB increase. These findings suggest that a silicone clad-silica core optical fiber would exhibit high radiation resistance. The very recent paper by G. H. Sigel et al titled "Radiation Response of Large Core Polymer Clad Silica Optical Fibers" presented at the IEEE Nuclear and Space Radiation Effects Conference (Santa Cruz, CA July 17-20, 1979) presented experimental confimation that plastic clad silica fibers are indeed the most radiation resistant optical waveguides currently available.

Unfortunately, the use of a silicone cladding in such an optical fiber presents one serious negative factor. At low temperatures, especially in the range of −40° C. to −50° C., it has been observed that the transmission loss in silicone clad-silica core optical fiber dramatically increases. In Applied Optics, 17, 3703 (1978), Yeung et al report that as the temperature of the silicone clad-silica core fiber decreases, the silicone cladding increases in density and refractive index much more rapidly than the silica core. Eventually, the refractive indices of the silicone and silica become equal. This precludes any further waveguiding effects due to complete frustration of total internal reflection at the core-cladding interface.

Thus, while silicone clad-silica core optical fibers represent an improvement over conventional fibers in radiation resistance, they are not effective at low temperatures. As many specifications for optical fiber systems require that they function at low temperature, there remains a need in the art for a radiation resistant optical fiber which is not as temperature sensitive as the recently studied silicone clad-silica core fibers.

SUMMARY OF THE INVENTION

Accordingly, it is a primary object of the invention to provide plastic clad optical fibers which function more effectively over a wider range of temperatures, particularly low temperatures, than heretofore possible.

Another object of the invention is to provide a method for preparing plastic clad optical fibers.

Still other objects and advantages of the invention will become evident to those of skill in the art upon review of the detailed description presented hereinafter.

These objects and advantages are provided by a plastic clad optical fiber comprising:

(i) a core comprised of silica and at least one dopant in an amount which is sufficient to achieve a refractive index substantially throughout the core which is at least 0.5% greater than the refractive index of undoped silica; and, (ii) a cladding surrounding said core comprised of a silicone resin having a refractive index less than the refractive index of silica.

It has been discovered that this combination of core and cladding will persist as a waveguide to temperatures of −55° C. and lower.

The clad fiber is preferably coated with an elastomeric outer jacket. The dopants contemplated for use in the core of the fiber may be any substances which increase the refractive index of silica without inhibiting its light transmitting capabilities. These include, but are not limited to, germanium oxide, phosphorus pentoxide, titanium oxide, tantalum oxide, tin oxide, niobium oxide, zirconium oxide, aluminum oxide, lanthanum oxide, gallium oxide and cerium oxide. These dopants may be included in the core alone or in combination. Particularly preferred dopants are germanium oxide ($GeO_2$) and phosphorus pentoxide ($P_2O_5$).

In preparing an optical fiber according to the invention, a thin, flexible glass fiber is first prepared by drawing a cylindrical rod comprised of silica and the dopant, or dopants. This fiber becomes the core of the optical fiber. A silicone resin coating is applied over the fiber core and becomes the plastic cladding of the optical fiber. The optional elastomeric outer jacket may then be applied, preferably by extrusion, over the silicone cladding.

DETAILED DESCRIPTION OF THE PREFERRED EMBODIMENTS

The cylindrical rod which is drawn to form the core of the optical fiber may be prepared according to any conventional method for preparing doped silica rods. According to a preferred embodiment of the invention, an external chemical vapor deposition (CVD) technique is used to deposit glass particles on a cylindrical starting member, such as a silica rod. In the chemical vapor deposition technique, submicron particles of silica and dopant are produced by the reaction of a gaseous mixture of silicon tetrachloride and the appropriate halide required to produce the dopant, at elevated temperatures. For example, to produce germaniasilicate particles, silicon tetrachloride and germanium tetrachloride are reacted with oxygen according to the following reaction mechanism:

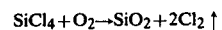

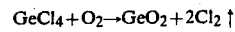

To produce phosphosilicate particles, phosphorus oxychloride (POCl₃) is substituted as the dopant source. Oxygen is provided by conducting the reaction in the ambient atmosphere or by providing an independent source of the gas. In a similar manner, silica particles containing a variety of dopants in various combinations can be produced.

The temperatures required to effect the reaction are achieved by conducting the deposition in a reaction furnace which heats the gaseous mixture of reactants to the appropriate temperature. Alternately, the requisite temperatures can be obtained by directing the reactants through a radio frequency induced plasma arc or a natural gas flame in the presence of oxygen. An inert gas such as argon or nitrogen may be used as a carrier for transporting the reactants to the reaction zone.

The glass particles produced by the chemical vapor deposition reaction are deposited on the cylindrical starting member to form a low density powder of doped silica. The density of this powder is approximately one-fifth the density of fully compacted glass. To insure that the particles are deposited uniformly over the starting member, it is placed in a lathe which rotates and translates at constant speeds. The powder is consolidated on the starting member by a subsequent high temperature heat treatment. Although it is possible to constantly heat the starting member to consolidate the particles as they are deposited, experience has taught that such heating is not easily controlled. Thus, it is preferred to consolidate to deposited particles by sintering after deposition is complete in a separate high temperature furnace. The use of a separate high temperature furnace is also helpful in maintaining close control of the OH concentration in the range of about 10 to 150 ppm. This is accomplished by adjusting the gas atmosphere in the furnace. For example, flowing chlorine gas through the furnace will scavange out hydrogen from the extremely large surface of the submicron glass particles according to the reaction:

$$2OH + Cl_2 \rightarrow 2HCl \uparrow + O_2 \uparrow$$

thereby reducing the OH concentration.

The resulting consolidated composite comprises the cylindrical starting member at its center covered by a uniform deposit of doped silica. While it is possible to remove the starting member prior to drawing the composite down to the dimensions of the core of an optical fiber, when the starting member is silica, this complication is not necessary, since the cross-sectional area of pure silica along the axis will be deminimus in comparison to the overall cross-section of the drawn composite. Hence, the drawn composite will be essentially completely comprised of doped silica.

The amount of dopant required in the core of the optical fiber of the invention is that which is sufficient to achieve a refractive index substantially throughout the core which is at least 0.5% greater than the refractive index of undoped silica. The term "substantially throughout" is used since when the silica starting member is not removed, the center of the core will include a small area of pure silica as previously described. A refractive index substantially throughout which is approximately 1% greater than that of silica is preferred for the core.

To achieve the minimum desirable refractive index, tests have shown that for germaniasilicate and phosphosilicate core fiber the core should contain a dopant level of at least 6 molar % germanium and 8 molar % phosphorus, respectively. The required amounts of other dopants as well as dopant combinations can be readily determined by those of skill in the art.

In conducting the chemical vapor deposition process to produce doped silica particles, the amount of dopant in the particles is controlled by adjusting the amount of dopant source, e.g., GeCl₄ or POCl₃, using standard stoichiometric principles, as is well known in the art. After the doped silica is fully consolidated by sintering, it is drawn in a heated drawing furnace to obtain a thin, flexible fiber having the diameter desired for the core of the optical fiber. This is preferably about 200 microns. To insure precise control of the diameter, it is advantageous to pass the fiber through a scanning laser beam system as it exits from the drawing furnace which senses the fiber diameter and automatically adjusts the fiber take-up speed to stabilize the diameter at the desired dimension. The fiber is then dip coated with a silicone resin by passing it vertically through a cup containing the resin. The exit of the cup is dimensioned to provide a uniform coating of silicone resin over the fiber of the desired diameter, preferably resulting in a plastic clad fiber having a diameter of about 350 microns. Immediately after dip coating, the silicone is rapidly cured by heat treatment. In a preferred embodiment, the coated fiber is then passed through an extrusion cross head where a durable elastomeric jacket is extruded over the fiber.

An exemplary method for preparing silicone resins is taught by Kookootsedes (Modern Plastics Encyclopedia, Vol. 50, No. 10A, October 1973). In this method, silicone resins are prepared by cohydrolysis of organochlorosilanes to form resin intermediates containing many silanol groups. The resin intermediate is subsequently partially condensed to produce a polysiloxane resin prepolymer which still contains a few silanol groups. This is the form in which the resin is stored and used as a coating. Upon heating, the remaining silanol groups of the resin prepolymer condense, forming new polysiloxane linkages in a three-dimensional crosslinked network.

While any silcone resin which effectively resists radiation, has a refractive index less than silica and is capable of withstanding temperatures as low as −75° C., is contemplated for use in the present invention, resins produced by Dow Corning under the trademark Sylgard have been found to be particularly effective. These resins have been used in flexible transmission lines for laser transmission systems as described in U.S. Pat. No. 3,434,776.

The elastomeric outer jacket may be formed of any of the well known jacketing materials for optical fibers. Particularly preferred are nylons and fluoropolymers, e.g., Teflon ®. The jacket is applied to the optical fiber by any conventional technique, most preferably extrusion.

The optical fiber prepared according to the invention is capable of withstanding extremely low temperatures without significant loss of waveguiding ability. It, therefore, is a significant advancement over the plastic clad-silica core fibers which have been heretofore suggested. The fibers of the invention are particularly useful in environments where ionizing radiation is prevalent or potentially prevalent due to the high radiation resistance of the plastic cladding.

While the invention has now been described in terms of certain preferred embodiments, the skilled artisan will readily appreciate that various modifications, changes, omissions and substitutions may be made without departing from the spirit thereof. It is intended, therefore, that the present invention be limited solely by the scope of the following claims.

What is claimed is:

1. A plastic clad optical fiber comprising:
   (i) a core of a given refractive index comprised of silica and at least one dopant in an amount which is sufficient to achieve a refractive index substantially throughout the core which is at least 0.5% greater than the refractive index of silica; and,
   (ii) a cladding surrounding said core comprised of a silicone resin having a refractive index less than the refractive index of silica;
   said fiber being capable of functioning in a temperature range of −40° C. to −50° C. without significant loss of waveguiding ability.

2. The optical fiber defined by claim 1, wherein said core is comprised of silica and at least one dopant selected from the group consisting of germanium oxide, phosphorus pentoxide, titanium oxide, tantalum oxide, tin oxide, niobium oxide, zirconium oxide, aluminum oxide, lanthanum oxide, gallium oxide and cerium oxide.

3. The optical fiber defined by claim 1, wherein said core is comprised of silica doped with germanium oxide or phosphorus pentoxide or mixtures thereof.

4. The optical fiber defined by claim 1, wherein the refractive index of the core is at least 1.0% greater than the refractive index of silica.

5. The optical fiber defined by claim 1, further comprising an elastomeric outer jacket surrounding said cladding.

6. The optical fiber defined by claim 1, wherein said core has a diameter of approximately 200 microns and said core plus cladding has a diameter of approximately 350 microns.

7. A method for preparing a plastic clad optical fiber comprising:
   (i) forming a thin, flexible glass fiber by drawing a cylindrical rod comprised of silica and at least one dopant in an amount which is sufficient to achieve a refractive index substantially throughout the rod which is at least 0.5% greater than the refractive index of silica; and,
   (ii) coating the glass fiber with a thin layer of silicone resin and heating said resin to produce a silicone cladding having a refractive index less than the refractive index of pure silica, to obtain a plastic clad optical fiber capable of functioning in a temperature range of −40° C. to −50° C. without significant loss of waveguiding ability.

8. The method defined by claim 7, wherein said cylindrical rod is comprised of silica and at least one dopant selected from the group consisting of germanium oxide, phosphorus pentoxide, titanium oxide, tantalum oxide, tin oxide, niobium oxide, zirconium oxide, aluminum oxide, lanthanum oxide, gallium oxide and cerium oxide.

9. The method defined by claim 7, wherein said cylindrical rod is comprised of silica doped with germanium oxide or phosphorus oxide or mixtures thereof.

10. The method defined by claim 7, further comprising extruding an elastomeric outer jacket over the silicone cladding.

11. The method defined by claim 7, wherein said cylindrical rod is formed by depositing glass particles on a cylindrical silica starting member, heating the resulting composite to sinter the particles and drawing the sintered composite to reduce its diameter.

12. The method defined by claim 11, wherein said glass particles are comprised of silica and at least one dopant selected from the group consisting of germanium oxide, phosphorus pentoxide, titanium oxide, tantalum oxide, tin oxide, niobium oxide, zirconium oxide, aluminum oxide, lanthanum oxide, gallium oxide and cerium oxide.

13. The method defined by claim 12, wherein said glass particles are formed by the vapor phase reaction of $SiCl_4$ and either or both $GeCl_4$ and $POCl_3$ with oxygen at elevated temperature.

14. The method defined by claim 11, wherein said glass particles are comprised of silica and either or both germanium oxide or phosphorus pentoxide.

15. The method defined by claim 7, wherein said cylindrical rod is drawn until a fiber having a diameter of approximately 200 microns is obtained.

16. The method defined by claim 7, wherein the diameter of said silicone clad glass fiber is approximately 350 microns.

17. In a method of transmitting information using a fiber optic system in environments subject to ionizing radiation and temperatures in the range of −40° C. to −50° C., the improvement comprising the use of a plastic clad optical fiber comprising:
   (i) a core of a given refractive index comprised of silica and at least one dopant in an amount which is sufficient to achieve a refractive index substantially throughout the core which is at least 0.5% greater than the refractive index of silica; and,
   (ii) a cladding surrounding said core comprised of a silicone resin having a refractive index less than the refractive index of silica;
   said fiber being capable of functioning in a temperature range of −40° C. to −50° C. without significant loss of waveguiding ability.

* * * * *